United States Patent [19]

Troffkin et al.

[11] 4,146,368
[45] Mar. 27, 1979

[54] GELLED ACRYLIC POLYMER

[75] Inventors: Howard J. Troffkin, Arlington, Va.; James J. Keavney, Norwalk, Conn.

[73] Assignee: The United States of America as represented by the Secretary of the Army, Washington, D.C.

[21] Appl. No.: 605,146

[22] Filed: Dec. 23, 1966

[51] Int. Cl.$^2$ ................................................. C01L 7/02
[52] U.S. Cl. ........................................ 44/7 D; 44/7 A; 44/51; 149/19.91; 252/316
[58] Field of Search ........................ 149/18, 19, 19.91; 44/7, 7 D, 7 A, 51; 252/316; 260/80.1

[56] References Cited

U.S. PATENT DOCUMENTS

| | | | |
|---|---|---|---|
| 3,087,844 | 4/1963 | Hudson et al. | 149/19 |
| 3,147,161 | 9/1964 | Abere et al. | 149/19 |
| 3,155,552 | 11/1964 | Vriesen | 149/19 |
| 3,177,101 | 4/1965 | Vriesen | 149/19 |
| 3,214,304 | 10/1965 | Vriesen | 149/19 |
| 3,957,550 | 5/1976 | Tannenbaum et al. | 44/7 A |
| 3,975,166 | 8/1976 | Troffkin | 44/7 D |

Primary Examiner—Leland A. Sebastian
Attorney, Agent, or Firm—Nathan Edelberg; Kenneth P. Van Wyck

[57] ABSTRACT

The invention relates to a cross-linked composition of matter comprising (A) acrylonitrile, (B) an acrylonitrile-soluble, carboxy group containing acrylic polymer capable of being cross-linked through the carboxy groups and (C) an acrylonitrile-soluble, carboxy group-reactive cross-linking agent. These compositions are fuel gels or flame agents which function over a wide spectrum of flame weapon applications including flame-throwers, shells and grenades.

10 Claims, No Drawings

GELLED ACRYLIC POLYMER

This invention relates to novel compositions of matter. More particularly, this invention relates to cross-linkable and cross-linked compositions of matter composed of acrylonitrile, a carboxy-containing, acrylonitrile-soluble polymer and a carboxy group-reactive, acrylonitrile-soluble cross-linking agent.

The gelling or thickening of gasoline for purposes of preparing compositions which may be used in aerial and ground warfare has been known for many years. Among the materials which have been used to gel or thicken gasoline to produce such compositions are the sodium and aluminum salts of various carboxylic acids such as caprylic acid, palmitic acid, naphthenic acid and the like. The resultant compositions, more familiarly known as napalm thickened gasoline, or simply "napalm", possess excellent flaming ability but suffer from many drawbacks. Two of the more serious shortcomings of napalm thickened gasoline are instability on storage and affinity for water. That is to say, the napalm gasoline gel is very unstable and therefore must be made near the site of its ultimate use and used within a relatively short period of time thereafter. Also, the gelling properties thereof are affected by moisture to the extent that substantially water-free conditions must prevail during its production. Moreover, the concentration of napalm thickener can only be varied over a relatively narrow range to give compositions having useful degrees of visco-elasticity.

We have now found a group of novel compositions which may be produced prior to their ultimate use and safely stored for long periods of time without decomposing. Furthermore, the compositions of the instant invention may be prepared under normal, every-day atmospheric conditions. Our compositions are not sensitive to water, i.e. they are hydrolytically stable and even more importantly they may be packaged, i.e., charged into flame munition casings, e.g. hand grenades, bombs etc., before the gelling thereof is completed.

Furthermore, the gelling agent composition and concentration may be varied over a relatively wide range which can give rise to a spectrum of products useful in weapons ranging from flame throwers to mines and shells. A further advantage of our compositions is their ability to transfer more heat to a target than other systems.

As mentioned above, the novel compositions of the instant invention are composed of three major components.

The first component is acrylonitrile which may be present in the composition in amounts ranging from about 80% to about 98%, preferably from about 95%–98%, by weight, based on the total weight of the final composition.

The second component is an acrylonitrile-soluble, free carboxy group-containing polymer capable of being cross-linked through the carboxy groups. Any polymer which fits this description may be used. A preferred polymer, however, is a terpolymer of methyl methacrylate, acrylonitrile and acrylic acid. The terpolymer may contain from about 50–90% of acrylonitrile, from about 10–50% of methyl methacrylate and from about 1%–5% of acrylic acid. The polymer may be used in the flame compositions of the instant invention in amounts ranging from about 1.5% to about 15.0%, preferably 2.0–10%, by weight, based on the total weight of the final compositions. Although it is not a critical feature, we have found that terpolymers having intrinsic viscosities ranging from about 2.0 to 5.0 dl/g. are reasonably effective. These polymers are known in the art and may be produced via any known procedure. For example, the terpolymer may be produced by contacting the monomers with a free-radical generating catalyst at elevated temperatures.

The third component of our novel compositions is an acrylonitrile-soluble, carboxy group reactive, cross-linking agent. Any material or compound which possesses these properties may be used. Examples of useful cross-linking agents include the triaziridines, e.g. 2,4,6-aziridinyl-s-triazine; various isocyanates such as toluene diisocyanate, hexamethylene diisocyanate, etc. epoxides such as vinylcyclohexane dioxide; diamines such as ethylene diamine and the like. The cross-linking agents should be used in stoichiometric amounts in relation to the available carboxyl groups of the polymer. Normally a slight excess of the cross-linking agent is used to assure complete reaction. Generally, we have found that amounts ranging from about 0.5% to about 5.0%, by weight, based on the total weight of the final compositions, are effective.

The novel cross-linkable compositions discussed hereinabove may be prepared by dissolving the appropriate amounts of the cross-linkable polymer and the cross-linking agent in the acrylonitrile with stirring. The resultant composition may then be cross-linked by storing it at room temperature for several days. Heating to temperatures above room temperature but below the boiling point of acrylonitrile causes a faster rate of cross-linking and concomittant gelling.

A composition within the scope of the instant invention which has been found particularly effective for use in flame-throwers is composed of 96–98%, by weight, of acrylonitrile, 2–4%, by weight, of terpolymer and 0.12%–0.16%, by weight, of cross-linking agent.

As mentioned above, our novel compositions are fuel gels or flame agents which function over a wide spectrum of flame weapon applications including flame-throwers, shells, grenades, etc.

The following examples are set forth for purposes of illustration only and are not to be construed as limitations on the instant invention except as set forth in the appended claims. All parts and percentages are by weight unless otherwise specified.

EXAMPLE 1

To 86.5 parts of acrylonitrile are added 6.5 parts of a terpolymer composed of acrylonitrile, methyl methacrylate and acrylic acid (50/45/5). To the resultant solution is then added 0.35 part of 2,4,6-aziridinyl-s-triazine. The resultant composition is sealed in a container at 60° C. for 24 hours. A gelled, viscoelastic composition is recovered. It ignites readily and burns with a semi-luminous flame.

EXAMPLE 2

The procedure of Example 1 is again followed except that 9.6 parts of terpolymer are used. A first portion of the resultant gel, when held at room temperature for 30 days shows no bubbles, discoloration or viscosity change. A similar gel using napalm shows discoloration and phase separation after the same time at the same temperature. Upon subjection of a second portion of the gel to other conditions to determine the long term stability thereof, the results set forth in Table I, below were achieved. The sample was stored at 60° C. and its gel strength in pounds of force was measured periodically on an Instron Tester at a strain rate of 10%/min. at a relative humidity of 50%.

TABLE I

| Time | Gel strength Force, lb. |
|---|---|
| 0 – 5 minutes | 1.5 |
| 3 days | 4.5 |
| 58 days | 4.5 |
| 5 months | 4.5 |

EXAMPLE 3

Following the procedure of Example 1 except that different amounts of terpolymer were used, the following results were observed. Room temperature conditions were used.

15% terpolymer — After 30 minutes the gel was tough and rubbery.

10% terpolymer — After 6 hours the gel was firm.

5% terpolymer — After 24 hours the gel was loose.

3% terpolymer — After 48 hours there was no gel but the solution had increased viscosity.

EXAMPLES 4–6

Following the procedure of Example 1, the following terpolymers resulted in gelled compositions within the scope of the present invention:

(A) 89% acrylonitrile, 9.9% methyl methacrylate, 1.1% acrylic acid;

(B) 49.6% acrylonitrile, 45.6% methyl methacrylate, 4.8% acrylic acid;

(C) 72% acrylonitrile, 23% methyl methacrylate, 5% acrylic acid.

EXAMPLES 7–14

Following the procedure of Example 1, using 90 parts of acrylonitrile and 10 parts of terpolymer, the following comparative results were obtained with various cross-linking agents.

TABLE II

| Ex. | Cross-Linking Agent | Results | | |
|---|---|---|---|---|
| 7 | Toluene diisocyanate | stiff, white gel | | |
| 8 | Hexamethylene diisocyanate | loose gel; fluid but cohesive | | |
| 9 | Vinylhexane dioxide | rubbery, gum-like gel | | |
| 10 | Ethylene diamine | gummy rubber | | |
| 11 | Cellulose gum | no gel | | |
| 12 | Etherified carbohydrate polymer | non-ionic no gel | cationic no gel | anionic no gel |
| 13 | Methyl cellulose | no gel | | |
| 14 | β-hydroxyethyl cellulose | no gel | | |

EXAMPLE 15

Following the procedure of Example 1 except that 2.5 parts of terpolymer, 97.5 parts of acrylonitrile and 0.14 part of the aziridine are used, a gelled, viscoelastic composition is recovered.

A sample of the recovered composition is charged into a standard test flame thrower and fired in the usual manner. It was projected at a 5° elevation and ignited. There was no tendency to "fire ball" and the ignited material stayed together in a flowing, coherent rod which exhibited very slight "break up". The range achieved was about 35–40 yards and most of the material was consumed.

We claim:

1. A cross-linkable composition of matter comprising (A) from about 80.0% to about 98.0%, by weight, based on the total weight of the composition, of acrylonitrile, (B) from about 1.5% to about 15.0%, by weight, same basis of an acrylonitrile-soluble, carboxy group-containing acrylic polymer capable of being cross-linked through the carboxy groups, and (C) from about 0.5% to about 5.0%, by weight, same basis, of an acrylonitrile-soluble, carboxy group-reactive cross-linking agent selected from the group consisting of the triaziridines, isocyanates, epoxides and diamines.

2. A composition according to claim 1 composed of about 96–98% of acrylonitrile, about 2–4% of said polymer and about 0.12–0.16% of said cross-linking agent.

3. A composition according to claim 1 wherein (B) is a terpolymer of acrylonitrile, methyl methacrylate and acrylic acid.

4. A composition according to claim 1 wherein (C) is 2,4,6-aziridinyl-s-triazine.

5. A composition according to claim 1 wherein (B) is a terpolymer of acrylonitrile, methyl methacrylate and acrylic acid and (C) is 2,4,6- triaziridinyl-s-triazine.

6. The composition of claim 1 in a cross-linked state.

7. The composition of claim 2 in a cross-linked state.

8. The composition of claim 3 in a cross-linked state.

9. The composition of claim 4 in a cross-linked state.

10. The composition of claim 5 in a cross-linked state.

* * * * *